US006950124B2

(12) United States Patent
Corl et al.

(10) Patent No.: US 6,950,124 B2
(45) Date of Patent: Sep. 27, 2005

(54) TRANSPORT STREAM PACKET MAP DISPLAY

(75) Inventors: Mark T. Corl, Princeton Junction, NJ (US); C. Gomer Thomas, Piscataway, NJ (US); Phyllis H. Caputo, Perrineville, NJ (US); David A. Catapano, Langhorne, PA (US)

(73) Assignee: Triveni Digital, Inc., Princeton Junction, NJ (US)

( * ) Notice: Subject to any disclaimer, the term of this patent is extended or adjusted under 35 U.S.C. 154(b) by 812 days.

(21) Appl. No.: 09/832,105

(22) Filed: Apr. 11, 2001

(65) Prior Publication Data

US 2002/0008781 A1 Jan. 24, 2002

Related U.S. Application Data

(60) Provisional application No. 60/197,663, filed on Apr. 17, 2000.

(51) Int. Cl.[7] ......................... H04N 17/00; H04N 17/02

(52) U.S. Cl. ........................ 348/180; 348/189; 348/192

(58) Field of Search ................................ 348/725, 571, 348/180, 181, 184, 189, 192, 193; 370/252; 375/224; 714/25, 46; 702/108, 127, 117; H04N 17/00, 17/02, 5/14, 5/44

(56) References Cited

U.S. PATENT DOCUMENTS 4,630,266 A * 12/1986 Deparis et al. ............. 370/252
5,640,388 A * 6/1997 Woodhead et al. ......... 370/468
6,057,882 A * 5/2000 van den Branden Lambrecht et al. ......... 348/192
6,188,674 B1 * 2/2001 Chen et al. ................. 370/252
6,366,314 B1 * 4/2002 Goudezeune et al. ....... 348/192
6,421,805 B1 * 7/2002 McAuliffe .................. 714/756
6,456,605 B1 * 9/2002 Laakso et al. .............. 370/330
6,484,143 B1 * 11/2002 Swildens et al. .............. 705/1

FOREIGN PATENT DOCUMENTS

JP 10042258 A * 2/1998 ............ H04N/7/00

* cited by examiner

*Primary Examiner*—Sherrie Hsia
(74) *Attorney, Agent, or Firm*—Birch, Stewart, Kolasch & Birch, LLP

(57) ABSTRACT

The invention provides technology to generate a graphical depiction on a video display device (VDD) for a stream of packets. Such a graphical depiction can take the form of a matrix of geometric shapes, e.g., squares, each geometric shape representing a packet. Each geometric shape can have an appearance that is indicative of what type the corresponding packet is. Colors can be assigned to the geometric shapes to denote the types of the corresponding packets, respectively. Such technology can also generate a graphical depiction on the VDD of a legend explaining color and packet type relations. Each color in the legend can be depicted in the form of the geometric shape, and each geometric shape can be operable as a pointing-device-clickable button so that, in response to a user clicking on one of the geometric shapes, an interface can be generated by which the color assigned to the geometric shape can be changed by the user.

49 Claims, 7 Drawing Sheets

(4 of 7 Drawing Sheet(s) Filed in Color)

TRANSPORT STREAM PACKET MAP DISPLAY

CONTINUING APPLICATION DATA

This application claims priority under 35. U.S.C. § 120 upon provisional U.S. patent application Ser. No. 60/197,663, filed Apr. 17, 2000, the entirety of which is hereby incorporated by reference.

FIELD OF THE INVENTION

The invention is directed toward the field of monitoring a digital signal, and more particularly to the field of monitoring a stream of packets, and more particularly toward how the monitored stream of packets is depicted on a display device, and more particularly to such a depiction of a digital television transport stream multiplex of packets.

BACKGROUND OF THE INVENTION

A digital television (DTV) signal (a transport stream multiplex of packets) is formed of multiple packets, some of which represent video data, some which represent audio data and some of which represent metadata. The metadata is used by a DTV receiver to reconstruct the packetized DTV signal for a given virtual channel. A terrestrial DTV broadcaster's bandwidth, or physical channel, can contain multiple virtual channels, where each channel can contain a program or some other content.

A DTV signal can conform to the Moving Picture Experts Group (MPEG) 2 standard. An MPEG2 Transport Stream is defined as a number of fixed-length packets. Each packet has a four-byte header that contains a synchronization byte, a packet identification number, a continuity count and several control bits.

The transport stream multiplex is a complex arrangement of separate, mostly-independent information. An MPEG2 transport stream multiplex can include up to 8192 different packet identifiers (PIDs). Typically, though, perhaps a dozen PIDs are used in a transport stream multiplex.

Analyzing or visualizing the contents of such a stream is difficult because the volume of data is large and the complexity of the data is relatively high. For example, a high definition television (HDTV) broadcast that complies with the American Television Standards Committee (ATSC), i.e., an ATSC-compliant HDTV broadcast, will minimally contain data that includes at least 10 separate packet identifiers (PIDs), and packets will be sent at a rate of approximately 2.4 million bytes of data, or 12.9 thousand packets, per second. And this merely represents a relatively simple transport stream. Streams with multiple standard digital television (SDTV) programs and full electronic program guide (EPG) support (another type of metadata) can include dozens of PIDs.

Understanding and visualizing such a great amount of data at even low rates can be very confusing.

The known monitoring systems provide a means of selecting specific packets based on PID and a pre-existing knowledge of packet location in the stream (packet occurrence). The display of these packets is done by providing a dump of the actual digital contents of a single packet along with some formatting to identify particular portions of the packet.

Some of the systems allow packets to be grouped and traversed based on the type of the packet as indicated by the PID. For example, the AT953-ATSC STREAM STATION model of monitoring and analyzing system available from SENCORE ELECTRONICS can do the following. Once a packet of a given type has been identified and its contents displayed, a user can click on a back button or a forward button to view the contents of the previous or next packet of the same type. But at any one instance, only the contents of a simple packet are displayed.

The known monitoring devices only characterize a packet by displaying its contents. That is, they fail to give a visual impression or characterization of the each packet in the transport stream multiplex independently of a display of its contents, especially as this relates to visually differentiating amongst the variety, and emphasizing the relative sequential arrangement, of different packets contained in the transport multiplex during a display of a portion of the multiplex. In addition, the user of the known monitoring devices must have extensive knowledge of the make-up of an MPEG2 stream in order to be able to select a packet whose contents are to be examined in more detail. For example, the user of the known monitoring/analysis systems can discover that the PID 49 is video by viewing the PAT, finding the associated PMT and then determining the type of PID 49 by looking at the detailed contents of the PMT.

In the computer industry, it is known to use a grid of color-coded boxes to depict the progress of a disk defragmenting operation. But such visual representations have never been applied to a transport stream multiplex. In more detail, as shown in FIG. 7, each box in the grid represents a cluster of data on the disk. As shown in FIG. 8, different colors are assigned to the boxes to denote whether a box corresponds to: data currently being read (prior to relocation by the defragmenting operation); data currently being written to a new, less-fragmented location; data having been relocated; free space; and data not yet operated upon in some way by the defragmenting operation. For the free space color, a first pattern (to denote data that will not be moved) or a second pattern (to denote a damaged disk area) can be superimposed. The boxes cannot be selected or clicked-on to retrieve additional information.

SUMMARY OF THE INVENTION

The invention, in part, provides a technology to monitor a packetized signal, e.g., at least a portion of a transport stream multiplex, by presenting a visual image of the signal to a user that conveys a visual impression of the contents of the transport stream multiplex without displaying the actual contents, especially as it relates to the variety of different packets contained in the transport multiplex and the relative sequential arrangement of the packets therein. Such technology does not require the user/viewer to have knowledge of the make-up of an MPEG2 stream in order to be able to select a packet whose contents she wishes to examine in more detail.

The invention, also in part, provides an integrated digital television (DTV) diagnostic instrument (and the method and software embodied therein) comprising: a video display device (VDD); a controller to receive a DTV signal in the form of a stream of packets and to generate a graphical depiction on said VDD of a plurality of individual packets representing said stream. Such technology is operable to drill down into (select finer detail about) the contents of individual packets in the stream and to generate a display of such contents.

Such a graphical depiction on the VDD for the stream of packets can take the form of a matrix of geometric shapes, e.g., a square, each geometric shape representing a packet. Each geometric shape can have an appearance that is indicative of what type the corresponding packet is. Colors can be assigned to the geometric shapes to denote the types of the corresponding packets, respectively. Such technology can also generate a graphical depiction on the VDD of a legend explaining color and packet type relations. Each color in the legend can be depicted in the form of the geometric shape, and each geometric shape can be operable as a pointing-device-clickable button so that, in response to a user clicking on one of the geometric shapes, an interface can be generated by which the color assigned to the geometric shape can be changed by the user.

Such technology can accommodate a stream of packets representing a DTV signal containing multiple video programs. In that situation, different shades of a color representing a type of packet are assigned to denote which one of the multiple video programs corresponds to the geometric shape.

Advantages of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The patent or application file contains at least one drawing excuted in color. Copies of this patent or patent application publication with color drawing(s) will be provided by the office upon request and payment of the necessary fees.

The present invention will become more fully understood from the detailed description given hereinbelow and the accompanying drawings which are given by way of illustration only, and thus do not limit the present invention.

DETAILED DESCRIPTION OF THE PREFERRED EMBODIMENTS

Figure 4:
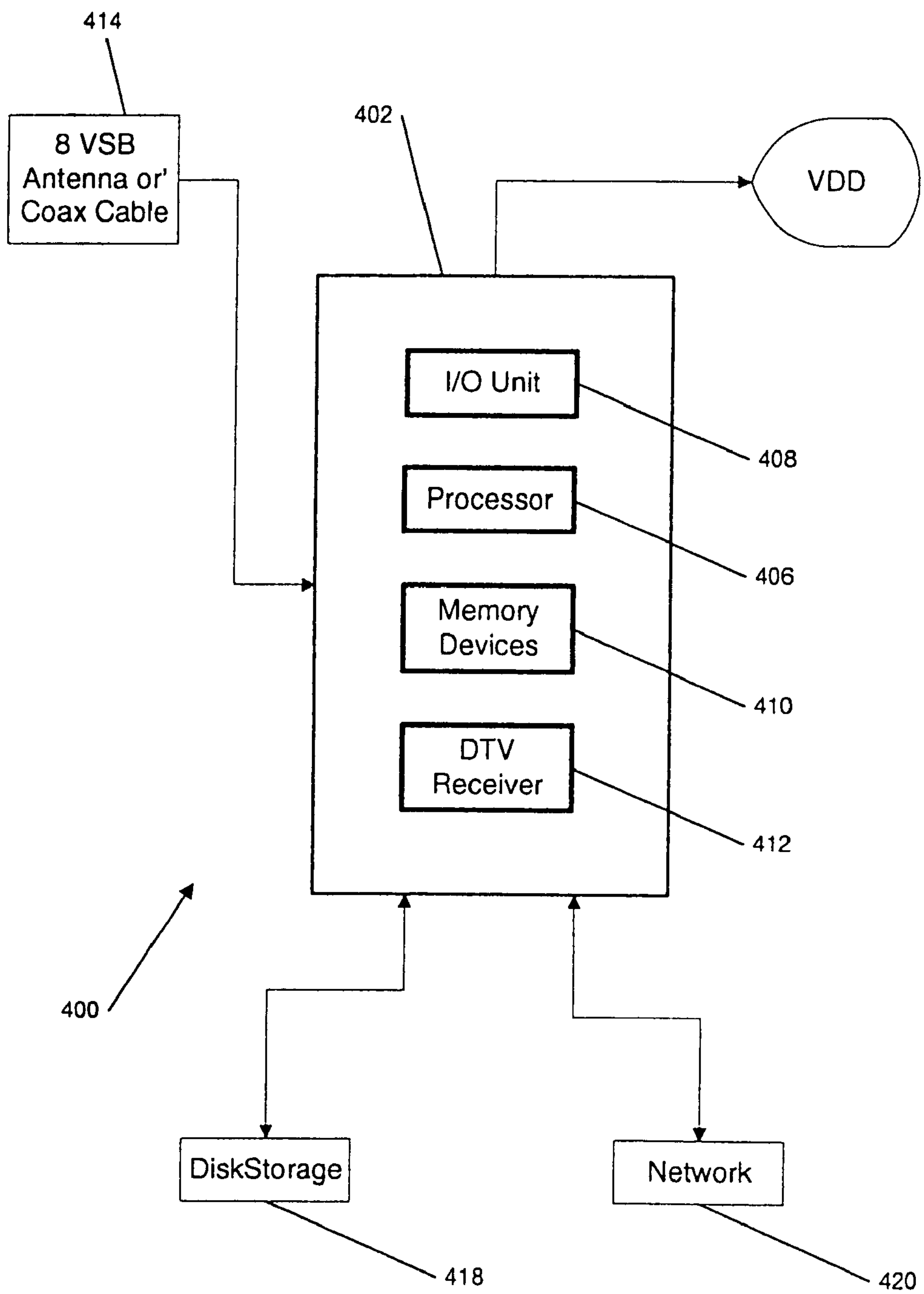
FIG. 4 depicts a block diagram of a hardware system 400 according to the invention that represents known hardware programmed according to the invention.

An integrated digital television (DTV) diagnostic instrument (and the method and software embodied therein) according to the invention uses known hardware programmed according to the invention. Such hardware is depicted in FIG. 4. The system 400 of FIG. 4 includes a computer/controller 402 having input/out circuitry 408, a processor 406, one or more memory devices 410 and a DTV receiver 412. The computer 402 is connected to a radio frequency (RF) antenna or to a coaxial cable via which the computer 402 receives a DTV signal, e.g., an 8 vestigial side band (VSB) signal. The output of the diagnostic instrument is provided to a video display device (VDD) 416 such as a liquid crystal display (LCD) device or cathode ray tube (CRT). Portions of DTV signals (received via the antenna/coaxial cable 414) can be saved to or retrieved from a disk storage unit 418 or from a network 420 via a connection such as an ethernet connection. The system 400 can be configured to be easily portable.

The DTV receiver 412 can be DTVCARD A1000 model of circuit board manufactured and sold by TRIVENI DIGITAL INC. The processor 406 can be of the PENTIUM family of processors sold by INTEL INC., e.g., a 450 MHz PENTIUM III processor, preferably running a WINDOWS 98 operating system manufactured and sold by the MICROSOFT CORPORATION in the case where the DTV A1000 card is employed as the DTV receiver 412. Examples of portable computers with expansions slots to accommodate the DTV A1000 card (among others) are the PAC series of rugged portable computers, e.g., the FLEXPAC and the LPAC, manufactured by DOLCH COMPUTER SYSTEMS, INC.

Alternatively, the DTV receiver 412 and/or the processor 406 can be configured to received alternative formats of the stream of packets. Such alternate formats can include the DvB ASI format and the Society of Motion Picture and Television Engineers (SMPTE) 310M-1998 format.

Upon receiving a stream of packets representing a DTV transport stream multiplex, the controller 402 is operable to generate a graphical depiction on the VDD 416 of the transport stream multiplex.

Figure 1:
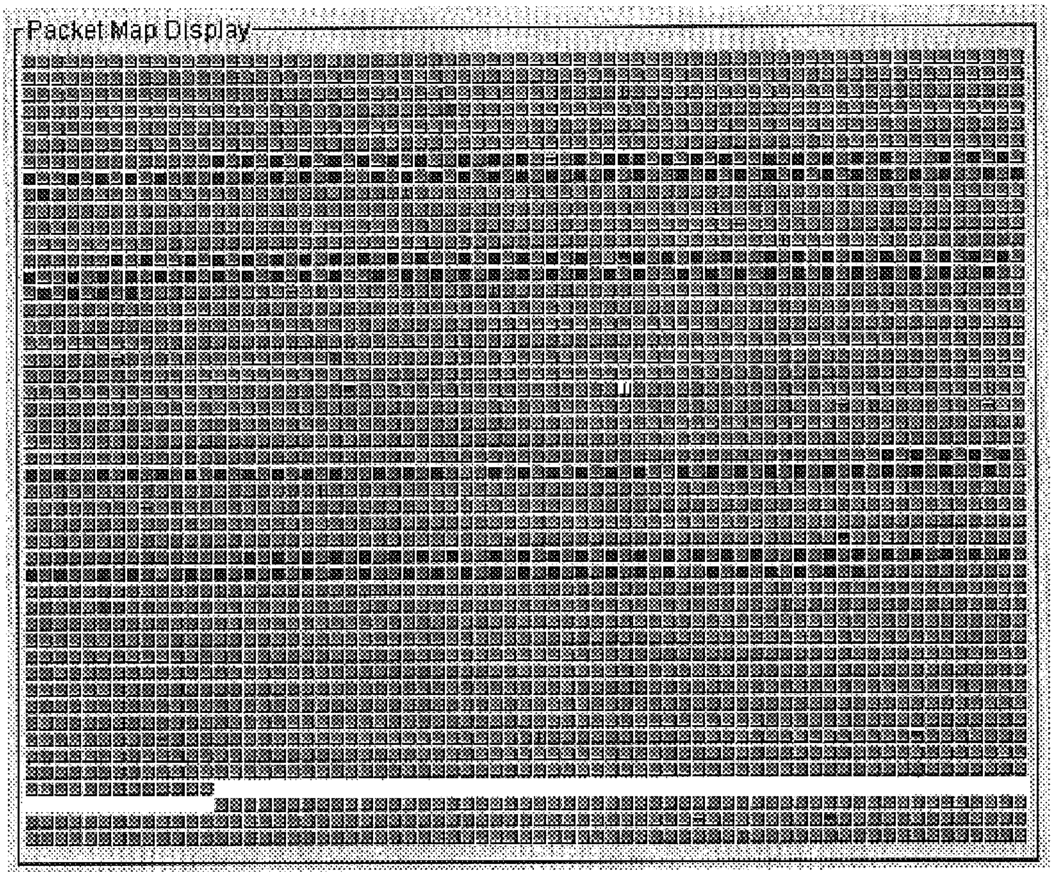
FIG. 1 is a snapshot depiction of a dynamic transport stream packet map display according to the invention.

Such a graphical depiction on the VDD 416 for the stream of packets can take the form of a grid/matrix of geometric shapes each geometric shape representing a packet, as in the transport stream packet map display of FIG. 1.

In FIG. 1, the geometric shapes are squares shaded to look like known examples of buttons used with known graphical user interface (GUI) technology. Each button is color-coded according to the type of data associated with its associated packet, i.e., the contents of its associated packet. The controller 402 is operable to display these packets in row-major order drawing each packet's button in a row from left to right and from the top row of the grid to the bottom.

It is to be noted that the color coding of FIG. 1 (and similarly FIG. 2) is but one example of the many permutations and combinations of colors that can be chosen.

Similarly, buttons in FIG. 1 are square, but any other shape could be used, e.g., rectangles, triangles. And it is to be noted that the arrangement of buttons of different appearance in FIG. 1 is a reflection of the particular portion of a particular DTV signal corresponding to a particular interval in the past. In practice, the actual grid will vary with each different DTV signal portion operated upon by the controller 402.

The controller 402 can generate the grid in real time as the DTV signal is received via an antenna or coaxial cable 414 or can operate upon a recorded portion of a DTV signal obtained via the disk storage device 418 or the network 420. As a practical matter, for at least the short term, the grid will most likely be generated based upon a recorded DTV signal because commercially available processors that are reasonable in cost do not have the processing power to generate the grid in real time. And if they did, the grid would scroll so fast as to be unintelligible to the typical user/viewer.

The effect is that the viewer sees the transport stream multiplex in slow motion with each button colored to indicate the contents or type of its associated packet. The general animation along with the packet map color-coding and arrangement give the viewer an impression as to the contents of the stream without actually displaying the contents of a packet unless the user desires to see such contents.

Colors can be assigned to the geometric shapes to denote the types of the corresponding packets, respectively. The processor 406 can also generate a graphical depiction on the VDD 416 of a legend explaining the relations between color and the contents or type of the associated packet such as in the packet map key of FIG. 2.

Figure 2:
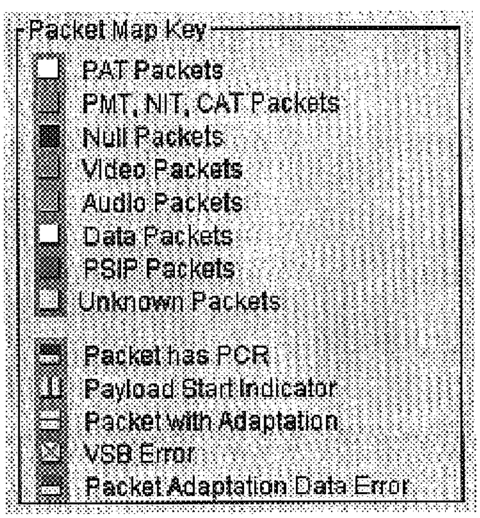
FIG. 2 depicts a legend indicating the meanings of the colors and patterns that geometric shapes in FIG. 1 can take.

In FIG. 2, the packet map key or legend provides at least two functions. First, it allows the user to easily associate graphical elements in the packet map display with the (non-displayed) actual packet contents. Second, it allows the user to customize the display.

Each color in the legend or packet map key of FIG. 2 can be depicted in the form of the geometric shape such as a square, and each geometric shape can be operable as a pointing-device-clickable button so that, in response to a user clicking on one of the geometric shapes, an interface can be generated by which the color assigned to the geometric shape can be changed by the user. Such a color assignment interface or dialog box is well known. The color assignment interface can allow customization either for personal taste or for filtering for particular types of data.

Figure 3:
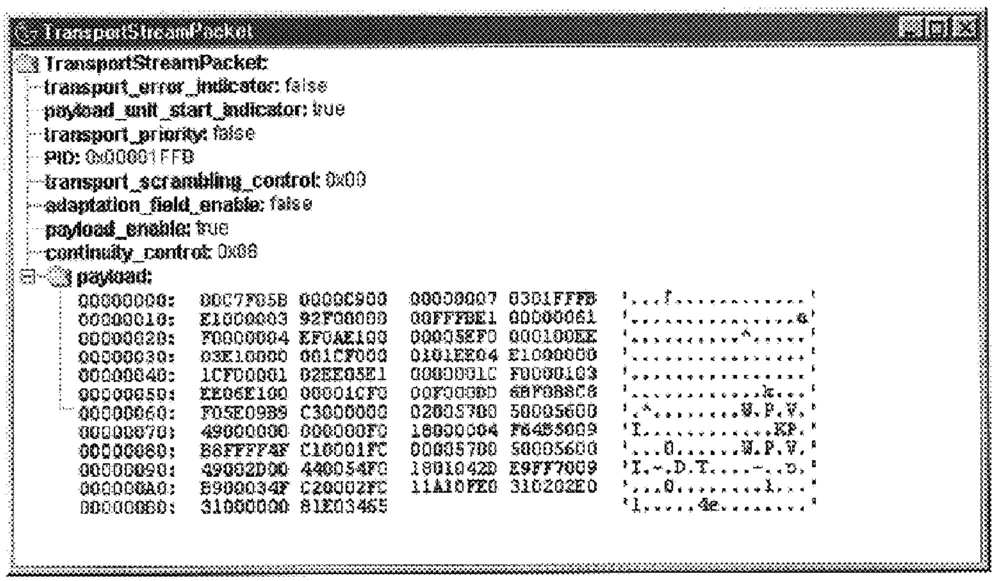
FIG. 3 is a display of the contents of one of the geometric shapes (buttons) in FIG. 1.

Also, each geometric shape in the packet map display is operable as a pointing-device-clickable button. When selected (e.g., clicked on) with a pointing device, the processor 406 is operable to respond with a detailed diagram of the actual packet contents or contained therein information, i.e., drill down into the contents of the packet, as in the example of FIG. 3. There, the depicted contents of the packet include the true false states of the following parameters: transport_error_indicator; payload_unit_start_indicator; transport_priority; transport_scrambling_control;

adaptation_field_enable; and payload_enable. FIG. 3 also depicts a hexadecimal value for the PID, the transport_scrambling_control parameter, the continuity_control parameter and the payload.

Such drill down capability, along with the ability to quickly find packet types in the display because of the visual differentiation (due to whatever particular combination of colors and patterning is chosen), allows the user to easily identify the packet of a given type or content, select the packet of interest and view it in detail.

The controller 402 generates the grid of geometric shapes representing the packets in the transport stream multiplex according to how the processor 406 is programmed. A first embodiment of such software uses the known JAVA button for each of the geometric shapes. A known JAVA button has a significant amount of standard functionality. While effective at generating the grid, it was determined that most of the standard functionality is not being used, thus representing a squandering of the processing power consumed to make it available. So a second embodiment was developed.

The second embodiment achieves the functionality for the buttons as was used in the first embodiment without all of the unused functionality of the true JAVA button.

The result is a quasi button or faux button. Instead of using JAVA buttons, the second embodiment is an adaptation of known technology for (1) recognizing cursor positions over images such as maps and (2) performing one or more actions particular to the cursor location in response to the click of a pointing device.

In the second embodiment, the processor 406 builds the entire packet map display in advance before operating upon a DTV signal. It fills the available area with squares such as those in FIG. 5.

Figure 5:
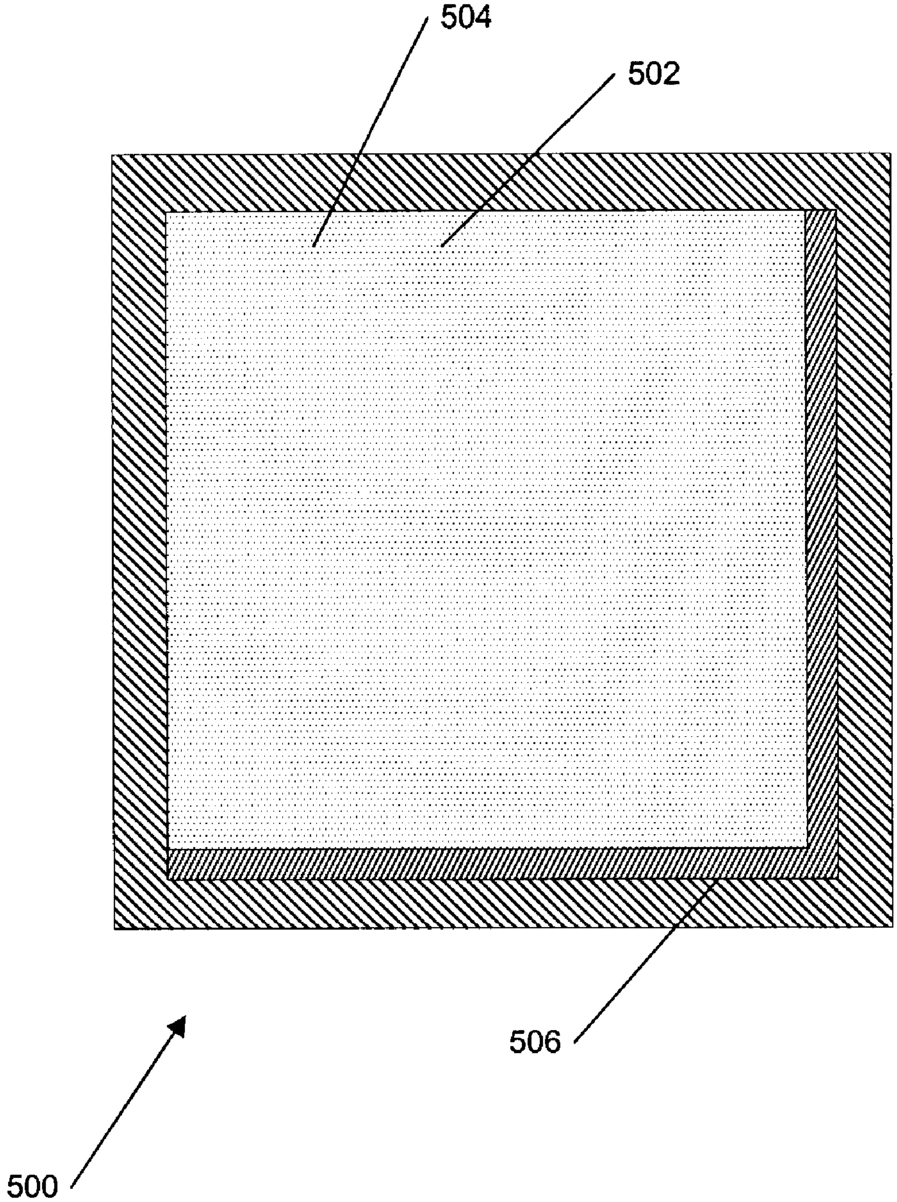
FIG. 5 depicts one of the blocks of FIG. 1 in more detail.
Figure 6:
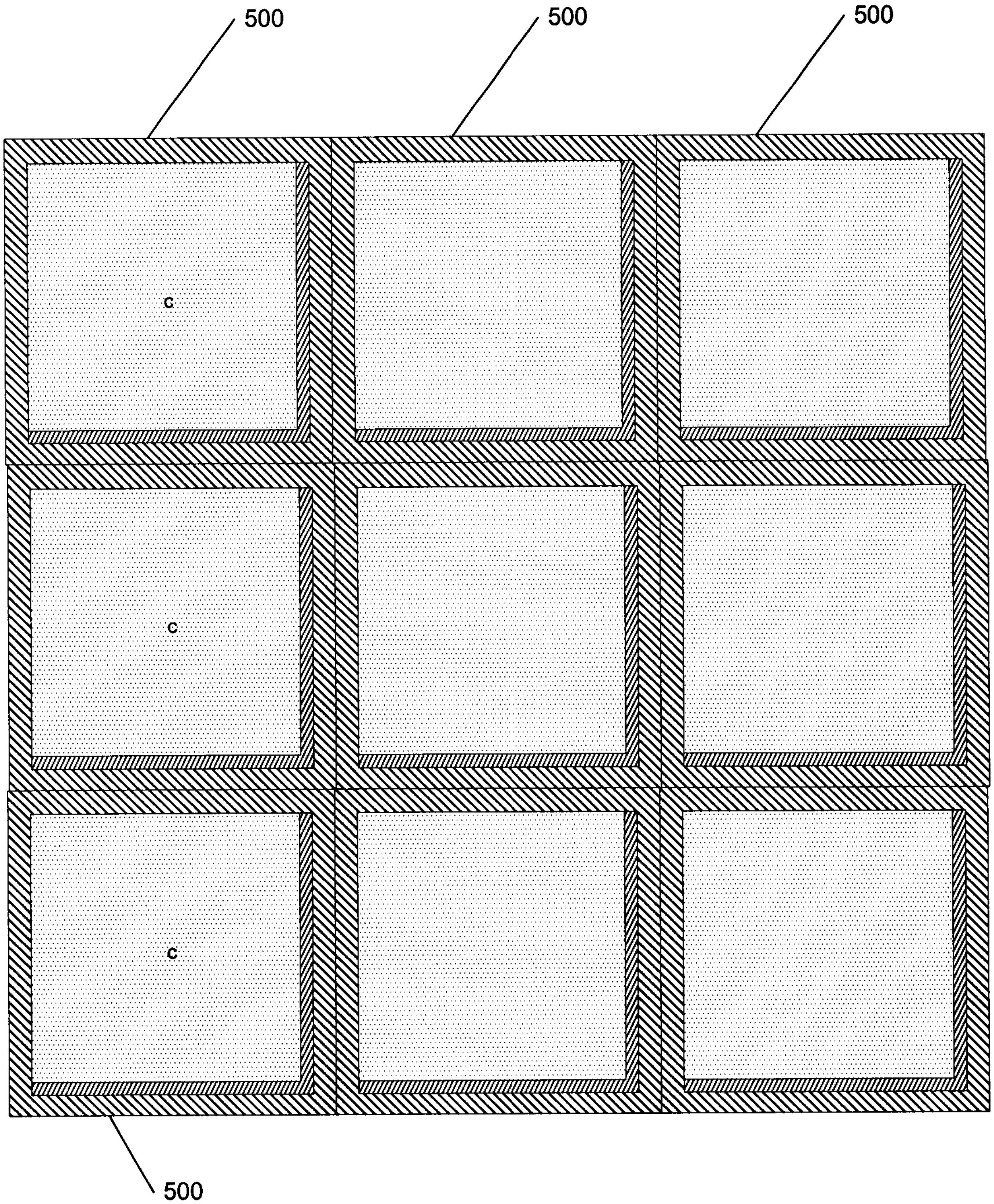
FIG. 6 depicts a group of adjacent blocks of FIG. 1 in more detail.
Figure 7:
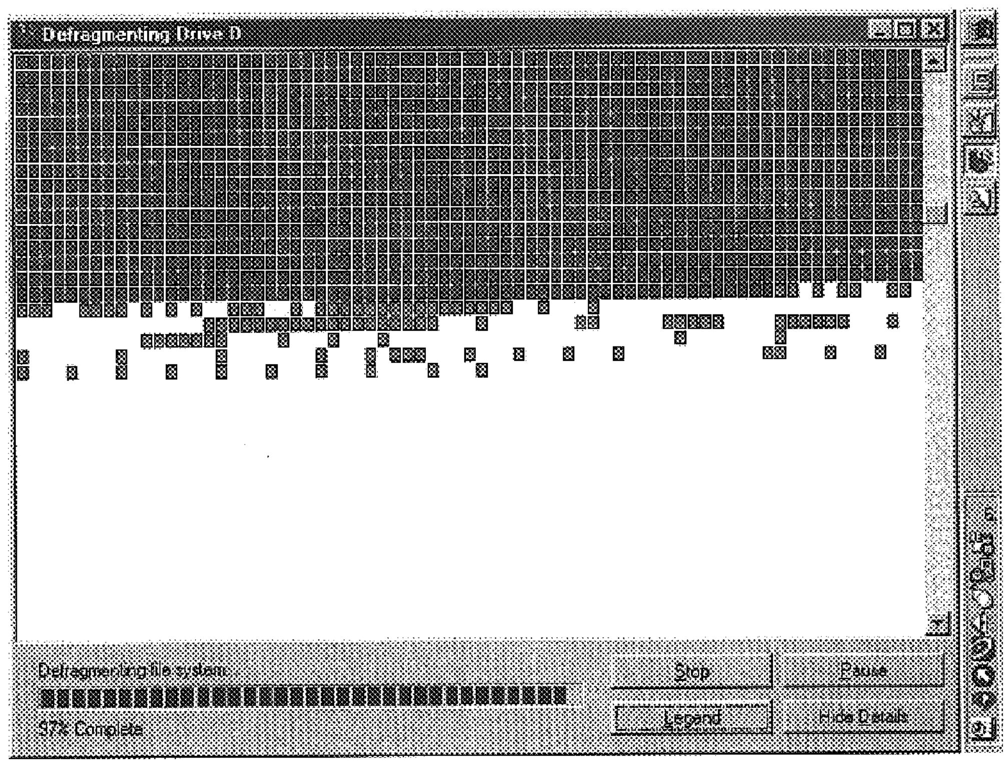
FIG. 7 is a snapshot depiction of a dynamic display of the progress of a disk defragmenting operation according to the Background Art.
Figure 8:
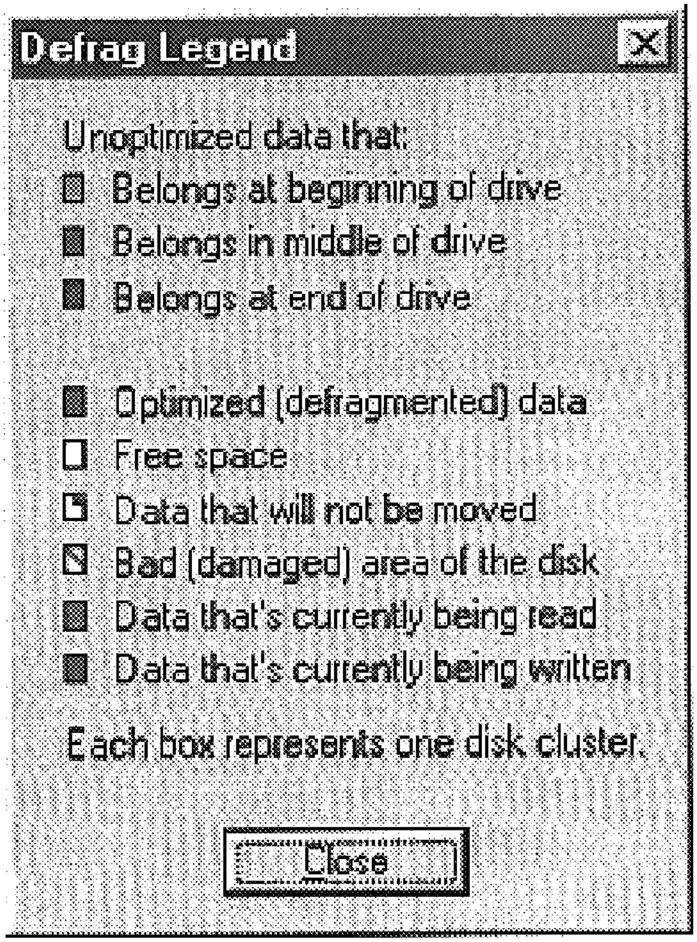
FIG. 8 is a legend indicating the meanings of the colors and patterns that boxes of FIG. 7 can take.

The square 500 in FIG. 5 includes a background color region 502 and a main region 504. Shading region 506 is provided to give the appearance of this shape being a standard button 506. The background region 502, the main region 504 and the shading 506 can be set to any desired combination of colors. Moreover, patterns (not depicted in FIG. 5) can be superimposed on the main region 504. FIG. 6 depicts a portion of the grid of FIG. 1 showing six of the adjacent buttons 500.

Initially, the processor sets the regions 502, 504 and 506 of each square 500 to all be the same background color so that each square 500 does not appear to be present on the display. As the processor 406 extracts data about the packets, it causes the squares 500 to repaint according to a predetermined color and pattern scheme.

An advantage of the second embodiment is the ease with which the faux buttons, i.e., the squares 500, can be made to repaint themselves, especially as compared to the standard JAVA button.

The following is example pseudocode (in the JAVA language) for generating faux buttons according to the second embodiment. Comments within the pseudocode are preceded by two asterisks (**)

```
** Class for the blocks in PacketMapDisplay
** A faux button or block is a simple structure having
** a width and a height. The block contains a reference to a
** transport stream packet.
** Detailed operations are described below.
class Block
    extends Rectangle
{
        ** The Block references a transport stream packet. The packet
        ** is first initialized to a dummypacket (which is not displayed).
        private TransportStreamPacket packet = dummyPacket;
    ** This method creates a block at a specific starting point with the
    ** specific width and height.
    Block( Point p, int width, int height)
    ** This method creates a block at a specific starting point defined by
    ** x and y coordinates with the specific width and height. The
    ** method also allows any additional shapes to be defined for the
    ** block such as PAYLOAD_START, ADAPTION, etc.
    Block(int xPoint, int yPoint, int width, int height, int shape)
    ** Provides a way to obtain the panel where the block is being
    ** drawn.
    static JPanel getContentsPanel( )
    ** Clears the contents panel (typically after a reset)
    static void clearInfoPanel( )
    ** Sets the color of the block
    synchronized void setColor(Color c)
    ** Provides a way for the transport stream packet associated
    ** with this block to be obtained.
    TransportStream Packet getPacket( )
    ** Clears the block, setting the transport stream packet equal
    ** to a dummy packet, setting the color to none, and the clicked flag
    ** to false
    synchronized void clear( )
    ** Sets the color and transport stream packet for the block and
    ** the clicked flag to false
    synchronized void set(TransportStreamPacket packet, Color c)
    ** This method is called when the particular packet should
    ** be drawn. The method should only be called when the block area
    ** needs to be redrawn. The parameter g is the graphics
    ** object for the component where block will be drawn.
    ** Drawing is based on the shape
    synchronized void draw( Graphics g
    {
        if ( shape != NOT_SET || packet != dummyPacket )
        {
            if ( color != null )
            {
```

-continued

```
                    g.setColor( color );
                    g.fillRect( xStart, yStart, width, height );
                    if ( packet.isTransportError( ) || shape ==
                    VSB_ERROR )
                    {
                        drawX( g, Color.red );
                    }
                    Adaptation a = packet.getAdaptationData( );
                    if ( ( a != null && a.hasPCR( ) ) || shape == PCR )
                    {
                        drawColorTopHalf( g, Color.black );
                        drawLineAcrossMiddle( g );
                    }
                    if ( ( a != null && !a.hasPCR( ) ) || shape ==
                    ADAPTATION )
                    {
                        drawLineAcrossMiddle( g );
                    }
                    if ( packet.isPayloadStart( ) || shape ==
                    PAYLOAD_START )
                    {
                        drawLineDownMiddle( g );
                    }
                    if ( packet instanceof TransportStreamErrorPacket ||
                        !packet.isPacketDataValid( ) ||
                        shape == ADAPTATION_ERROR )
                    {
                        drawColorTopHalf( g, Color.red );
                        drawLineAcrossMiddle( g );
                    }
                }
                ** last draw outline
                if(packet != null )
                {
                    g.setcolor( Color.black );
                    if ( clicked )
                    {
                        g.drawLine( xStart, yStart, xStart,
                        yStart+height−1 );
                        g.drawLine( xStart, yStart,
                        xStart+width−1 yStart );
                    }
                    else
                    {
                        g.drawLine( xStart+width−1, yStart+height−1,
xStart, ystart+height−1);
                        g.drawLine( xStart+width−1, yStart+height−1,
xStart+width−1, yStart);
                    }
                }
            }
        }
        ** Draws line across middle of block based on if the button is
        ** clicked, the height, and width
        protected void drawLineAcrossMiddle( Graphics g )
        ** Draws line down middle of block based on if the button is
        ** clicked, the height, and width
        protected void drawLineDownMiddle( Graphics g )
        ** Draws an 'x' on the block based on if the button is
        ** clicked, the height, and width
        protected void drawX( Graphics g, Color c )
        ** Colors bottom half of block
        protected void drawColorBottomHalf( Graphics g, Color c )
        ** Colors top half of block
        protected void drawColorTopHalf( Graphics g, Color c )
        ** Draws small inner square in block based on height and width
        protected void drawInnerSquare( Graphics g )
        ** Draws thicker border around block based on width & height
        protected void drawThickerBorder( Graphics g )
        ** sets clicked flag and redraws block
        synchronized void setClicked( Graphics g, boolean value )
        ** displays transport stream packet
        synchronized void view( )
}
```

The particular example of color and pattern combinations in FIGS. 1–2 will now be discussed. The transport stream being displayed contains video packets corresponding to green buttons. This transport stream contains multiple video programs, so buttons corresponding to video packets from other programs are colored a slightly darker shade of green to separate them. Audio packets in this stream are represented by light blue (cyan) buttons. Note that the stream also contains another audio program, likely associated with the second video program. Buttons corresponding to the additional audio packets are colored a slightly darker shade of cyan. Black buttons correspond to empty entries (so called "null" packets) that could (but have not) been used for some other purpose but are included in the stream as filler. A yellow button corresponds to a data packet. A pink button corresponds to a program and system information protocol (PSIP) packet. A gray button corresponds to an unknown type of packet. A white button corresponds to a PAT packet. And an orange button corresponds to one of a PMT packet, a network information table (NIT) packet or a conditional access table (CAT) packet.

It is to be noted that an ATSC-compliant transport stream may have a number of different types of transport packets: audio, video, data, PSIP, null, and unknown. Packets of unknown type can indicate one or more problems with the PAT, PMT and PSIP tables, since the tables should allow the DTV receiver 412 to identify the type of every packet that appears in the broadcast stream. However, almost all packets are "unknown" to the DTV receiver 412 until the program association table (PAT), program map tables (PMTs) and PSIP master guide table (MGT) are encountered in the DTV packet transport multiplex, so it is normal to encounter a large block of packets of the unknown type at the initial stage of analysis.

In addition to color information, there are also patterns superimposed on the button colors that indicate other additional information aside from simply the type of the associated packet. A button for which half is black indicates that the corresponding packet has a program clock reference (PCR). Each vertical or horizontal line through a button represents a flag in the packet header. More particularly, a button having a superimposed vertical line indicates that the corresponding packet is the start of a payload. And a button having a superimposed horizontal line indicates that that the corresponding packet is a packet with adaptation. A button having superimposed diagonal intersecting lines indicates that the corresponding packet has a transport error. And a button for which half is pink indicates that the corresponding packet has a packet adaptation data error.

Experienced operators can easily determine where such things as payload start indicators and adaptation headers occur by quickly looking at the display. If errors occur, these are marked with certain graphical symbols to easily allow the operator to determine where the error occurred.

The large white row of FIG. 1 indicates where the packets are being updated. In a normal display, this bar repeatedly "sweeps" through the display from top to bottom so as to give the impression that the grid is generated in a first-in-first-out manner, updating packets continuously drawing packet buttons until the user requests a pause.

The large white row is also formed of the squares 500, except that the background region 502, the main region 504 and the shading region 506 are all set to the color of the large row, namely white.

The invention is especially well suited to operating upon terrestrial digital television signals, but it is equally applicable to any packetized signal.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An integrated digital television (DTV) diagnostic instrument comprising:

a video display device (VDD); and a controller to receive a DTV signal in the form of a stream of packets and to generate a graphical depiction on said VDD of types or specific contents of a plurality of individual packets representing said stream.

2. The instrument of claim 1, wherein said controller is embodied by a processor running software.

3. The instrument of claim 1, further comprising:

DTV circuitry to receive a DTV signal and to reconstruct said stream of packets representing said DTV signal;

wherein said controller receives said stream of packets from said DTV circuitry.

4. The instrument of claim 3, further comprising an antenna to receive a broadcast of said DTV signal, wherein said DTV circuitry is connected to receive said DTV signal from said antenna.

5. The instrument of claim 3, further comprising:

recording circuitry to record said stream of packets from said DTV circuitry;

wherein said controller is operable to generate said graphical depiction based upon the recorded stream of packets.

6. The instrument of claim 1, wherein said graphical depiction on said VDD of said stream of packets takes the form of a matrix of geometric shapes, each geometric shape representing a packet.

7. The instrument of claim 6, wherein each geometric shape is a square.

8. The instrument of claim 6, wherein each geometric shape in said matrix thereof is operable as a pointing-device-clickable button.

9. The instrument of claim 8, wherein said controller is operable, in response to a user clicking on one of said geometric shapes, to display contents of the corresponding packet on said VDD.

10. The instrument of claim 6, wherein said controller is operable to depict a break in said matrix where previously displayed geometric shapes are replaced with new geometric shapes in order to represent the streaming nature of said DTV signal.

11. The instrument of claim 10, wherein said break takes the form of a blank row in said matrix.

12. The instrument of claim 11, wherein said controller is operable to move said blank row through said matrix.

13. The instrument of claim 6, wherein a packet map display sub-area forms a part of a total display area on said VDD, said packet map display sub-area being smaller than is needed to display an entire stream of packets; and wherein said controller is operable to enable a user to scroll the portion of said matrix depicted in said packet map display sub-area.

14. An integrated digital television (DTV) diagnostic instrument comprising:

a video display device (VDD);

a controller to receive a DTV signal in the form of a stream of packets and to generate a graphical depiction on said VDD of a plurality of individual packets representing said stream; and DTV circuitry to receive a DTV signal and to reconstruct said stream of packets representing said DTV signal;

wherein said controller receives said stream of packets from said DTV circuitry, and wherein said controller is operable to drill down into the contents of individual ones of said stream of packets and to generate a display of such contents.

15. An integrated digital television (DTV) diagnostic instrument comprising:

a video display device (VDD); and a controller to receive a DTV signal in the form of a stream of packets and to generate a graphical depiction on said VDD of a plurality of individual packets representing said stream, wherein said graphical depiction on said VDD of said stream of packets takes the form of a matrix of geometric shapes, each geometric shape representing a packet, and wherein each geometric shape has an appearance that is indicative of what type the corresponding packet is.

16. The instrument of claim 15, wherein colors are assigned to said geometric shapes to denote the types of the corresponding packets, respectively.

17. The instrument of claim 16, wherein said controller is operable to generate a graphical depiction on said VDD of a legend explaining color and packet type relations.

18. The instrument of claim 17, wherein each color in said legend is depicted in the form of said geometric shape, and each geometric shape is operable as a pointing-device-clickable button; and wherein said controller is operable, in response to a user clicking on one of said geometric shapes, to present an interface by which the color assigned to the geometric shape can be changed by said user.

19. The instrument of claim 16, wherein said stream of packets representing said DTV signal contains multiple video programs, and wherein different shades of a color representing a type of packet are assigned to denote which one of said multiple video programs corresponds to the geometric shape.

20. The instrument of claim 16, wherein said controller adheres to at least one of the following color definitions:

a green geometric shape corresponds to a video packet;

a cyan geometric shape corresponds to an audio packet;

a black geometric shape corresponds to a null packet;

a yellow geometric shape corresponds to a data packet;

a pink shape corresponds to a program and system information protocol (PSIP) packet;

a gray geometric shape corresponds to an unknown type of packet;

a white geometric shape corresponds to a PAT packet; and an orange geometric shape corresponds to one of a PMT packet, an NIT packet or a CAT packet.

21. The instrument of claim 15, wherein a plurality of geometric patterns is superimposed on predetermined ones, respectively, of said geometric shapes to denote qualities of the corresponding packets, respectively.

22. The instrument of claim 21, wherein said controller adheres to at least one of the following geometric pattern definitions:

a geometric shape for which half is black denoting that the corresponding packet has PCR;

a geometric shape having a superimposed vertical line denoting that the corresponding packet is the start of a payload;

a geometric shape having a superimposed horizontal line denoting that the corresponding packet is a packet with adaptation;

a geometric shape having superimposed diagonal intersecting lines denoting that the corresponding packet has a transport error and a geometric shape for which half is pink denoting that the corresponding packet has a packet adaptation data error.

23. In an integrated digital television (DTV) diagnostic instrument having a video display device (VDD), a method of generating graphical depictions on said VDD of a stream of packets representing a DTV signal, the method comprising:

providing a DTV signal in the form of a stream of packets; and generating a graphical depiction on said VDD of types or specific contents of a plurality of individual packets representing said stream.

24. The method of claim 23, wherein the stream is provided by retrieving a recorded portion of a DTV signal from memory.

25. The method of claim 23, wherein the stream is provided by receiving a broadcast of a DTV signal.

26. The method of claim 23, wherein said graphical depiction on said VDD of said stream of packets takes the form of a matrix of geometric shapes, each geometric shape representing a packet.

27. The method of claim 26, wherein colors are assigned to said geometric shapes to denote the types of the corresponding packets, respectively.

28. The method of claim 26, wherein a plurality of geometric patterns is superimposed on predetermined ones, respectively, of said geometric shapes to denote qualities of the corresponding packets, respectively.

29. The method of claim 26, wherein each geometric shape in said matrix thereof is operable as a pointing-device-clickable button; and wherein, in response to a user clicking on one of said geometric shapes, contents of the corresponding packet are displayed on said VDD.

30. The method of claim 26, wherein a break in said matrix is depicted at a location where previously displayed geometric shapes are replaced with new geometric shapes in order to represent the streaming nature of said DTV signal;

wherein said break takes the form of a blank row in said matrix; and wherein said blank row is moved through said matrix.

31. The method of claim 23, wherein said controller is operable to generate a graphical depiction on said VDD of a legend explaining color and packet type relations.

32. A computer-readable article of manufacture having embodied thereon software comprising a plurality of code segments to generate graphical depictions on a video display device (VDD) of a stream of packets representing a DTV signal, the computer-readable code segments comprising:

a first segment to receive a DTV signal in the form of a stream of packets; and a second code segment to generate a graphical depiction on said VDD of types or specific contents of a plurality of individual packets representing said stream.

33. The computer-readable code segments of claim 32, wherein said second segment is operable to receive said stream of packets from DTV circuitry that receives a DTV signal from an antenna and reconstructs said stream therefrom.

34. The computer-readable code segments of claim 32, wherein said second segment is operable to generate said graphical depiction based upon a recorded stream of packets.

35. The computer-readable code segments of claim 32, wherein said graphical depiction on said VDD of said stream of packets takes the form of a matrix of geometric shapes, each geometric shape representing a packet.

36. The computer-readable code segments of claim 35, wherein colors are assigned to said geometric shapes to denote the types of the corresponding packets, respectively.

37. The computer-readable code segments of claim 35, wherein a plurality of geometric patterns is superimposed on predetermined ones, respectively, of said geometric shapes to denote qualities of the corresponding packets, respectively.

38. The computer-readable code segments of claim 35, wherein each geometric shape in said matrix thereof is operable as a pointing-device-clickable button; and wherein said second segment is operable, in response to a user clicking on one of said geometric shapes, to display contents of the corresponding packet on said VDD.

39. The computer-readable code segments of claim 35, wherein said second code segment is operable to depict a break in said matrix where previously displayed geometric shapes are replaced with new geometric shapes in order to represent the streaming nature of said DTV signal;

wherein said break takes the form of a blank row in said matrix; and wherein said second code segment is operable to move said blank row through said matrix.

40. The computer-readable code segments of claim 32, wherein said second segment is operable to also generate a graphical depiction on said VDD of a legend explaining color and packet type relations.

41. An integrated digital television (DTV) diagnostic instrument comprising:

a video display device (VDD); and a controller to receive a DTV signal in the form of a stream of packets and to generate a graphical depiction on said VDD of a plurality of individual packets representing said stream, wherein said graphical depiction on said VDD of said stream of packets takes the form of a matrix of geometric shapes, each geometric shape representing a packet, and wherein each geometric shape in said matrix thereof is operable as a pointing-device-clickable button.

42. An integrated digital television (DTV) diagnostic instrument comprising:

a video display device (VDD); and a controller to receive a DTV signal in the form of a stream of packets and to generate a graphical depiction on said VDD of a plurality of individual packets representing said stream, wherein said graphical depiction on said VDD of said stream of packets takes the form of a matrix of geometric shapes, each geometric shape representing a packet, and wherein said controller is operable to depict a break in said matrix where previously displayed geometric shapes are replaced with new geometric shapes in order to represent the streaming nature of said DTV signal.

43. An integrated digital television (DTV) diagnostic instrument comprising:

a video display device (VDD); and a controller to receive a DTV signal in the form of a stream of packets and to generate a graphical depiction on said VDD of a plurality of individual packets representing said stream, wherein said graphical depiction on said VDD of said stream of packets takes the form of a matrix of geometric shapes, each geometric shape representing a packet, wherein a packet map display sub-area forms a part of a total display area on said VDD, said packet map display sub-area being smaller than is needed to display an entire stream of packets, and wherein said controller is operable to enable a user to scroll the portion of said matrix depicted in said packet map display sub-area.

44. In an integrated digital television (DTV) diagnostic instrument having a video display device (VDD), a method of generating graphical depictions on said VDD of a stream of packets representing a DTV signal, the method comprising:

providing a DTV signal in the form of a stream of packets; and generating a graphical depiction on said VDD of a plurality of individual packets representing said stream, and wherein said graphical depiction on said VDD of said stream of packets takes the form of a matrix of geometric shapes, each geometric shape representing a packet, and wherein colors are assigned to said geometric shapes to denote the types of the corresponding packets, respectively.

45. In an integrated digital television (DTV) diagnostic instrument having a video display device (VDD), a method of generating graphical depictions on said VDD of a stream of packets representing a DTV signal, the method comprising:

providing a DTV signal in the form of a stream of packets; and generating a graphical depiction on said VDD of a plurality of individual packets representing said stream, wherein said controller is operable to generate a graphical depiction on said VDD of a legend explaining color and packet type relations.

46. In an integrated digital television (DTV) diagnostic instrument having a video display device (VDD), a method of generating graphical depictions on said VDD of a stream of packets representing a DTV signal, the method comprising:

providing a DTV signal in the form of a stream of packets; and generating a graphical depiction on said VDD of a plurality of individual packets representing said stream, wherein said graphical depiction on said VDD of said stream of packets takes the form of a matrix of geometric shapes, each geometric shape representing a packet, and wherein each geometric shape in said matrix thereof is operable as a pointing-device-clickable button.

47. A computer-readable article of manufacture having embodied thereon software comprising a plurality of code segments to generate graphical depictions on a video display device (VDD) of a stream of packets representing a DTV signal, the computer-readable code segments comprising:

a first segment to receive a DTV signal in the form of a stream of packets; and a second code segment to generate a graphical depiction on said VDD of a plurality of individual packets representing said stream, wherein said graphical depiction on said VDD of said stream of packets takes the form of a matrix of geometric shapes, each geometric shape representing a packet, and wherein colors are assigned to said geometric shapes to denote the types of the corresponding packets, respectively.

48. A computer-readable article of manufacture having embodied thereon software comprising a plurality of code segments to generate graphical depictions on a video display device (VDD) of a stream of packets representing a DTV signal, the computer-readable code segments comprising:

a first segment to receive a DTV signal in the form of a stream of packets; and a second code segment to generate a graphical depiction on said VDD of a plurality of individual packets representing said stream, wherein said second segment is operable to also generate a graphical depiction on said VDD of a legend explaining color and packet type relations.

49. A computer-readable article of manufacture having embodied thereon software comprising a plurality of code segments to generate graphical depictions on a video display device (VDD) of a stream of packets representing a DTV signal, the computer-readable code segments comprising:

a first segment to receive a DTV signal in the form of a stream of packets;

a second code segment to generate a graphical depiction on said VDD of a plurality of individual packets representing said stream, wherein said graphical depiction on said VDD of said stream of packets takes the form of a matrix of geometric shapes, each geometric shape representing a packet, and wherein each geometric shape in said matrix thereof is operable as a pointing-device-clickable button.

* * * * *